(12) United States Patent
Takagi

(10) Patent No.: US 10,816,166 B2
(45) Date of Patent: Oct. 27, 2020

(54) LIGHT SOURCE APPARATUS AND PROJECTOR

(71) Applicant: SEIKO EPSON CORPORATION, Tokyo (JP)

(72) Inventor: Chigusa Takagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 361 days.

(21) Appl. No.: 15/478,647

(22) Filed: Apr. 4, 2017

(65) Prior Publication Data

US 2017/0307179 A1    Oct. 26, 2017

(30) Foreign Application Priority Data

Apr. 21, 2016   (JP) ................................ 2016-085193

(51) Int. Cl.
| | |
|---|---|
| *F21V 15/01* | (2006.01) |
| *F21K 9/64* | (2016.01) |
| *G03B 21/14* | (2006.01) |
| *F21Y 115/30* | (2016.01) |

(52) U.S. Cl.
CPC ............... *F21V 15/01* (2013.01); *F21K 9/64* (2016.08); *G03B 21/14* (2013.01); *F21Y 2115/30* (2016.08)

(58) Field of Classification Search
CPC ........... F21V 15/01; G03B 21/14; F21K 9/62; H01L 33/483; H01L 33/48; H01L 33/58; H01L 33/64; H01L 33/52; H01L 33/54; H01L 33/56; H01L 2924/351

USPC ......... 362/240, 311.05, 311.01, 311.02, 235, 362/249.02; 257/98–100
See application file for complete search history.

(56) References Cited

U.S. PATENT DOCUMENTS

| | | | | |
|---|---|---|---|---|
| 8,183,585 | B2 * | 5/2012 | Scotch ...................... | F21K 9/00 257/97 |
| 8,262,257 | B2 * | 9/2012 | Deeben ................. | H01L 33/508 362/249.02 |
| 2008/0037252 | A1 * | 2/2008 | Nii .......................... | H01L 33/60 362/267 |
| 2008/0116473 | A1 * | 5/2008 | Sugiyama ............. | H01L 33/483 257/98 |
| 2009/0129085 | A1 * | 5/2009 | Aizar .................... | H01L 33/483 362/247 |

(Continued)

FOREIGN PATENT DOCUMENTS

| | | |
|---|---|---|
| JP | 2005-191313 A | 7/2005 |
| JP | 2015-12101 A | 1/2015 |
| JP | 2015-045843 A | 3/2015 |

*Primary Examiner* — Bryon T Gyllstrom
*Assistant Examiner* — James M Endo
(74) *Attorney, Agent, or Firm* — Oliff PLC

(57) ABSTRACT

A light source apparatus includes a base substrate made of a metal material, a plurality of light emitting devices provided on a first surface of the base substrate, a frame so provided on the first surface of the base substrate as to surround the plurality of light emitting devices, and a light transmissive member that is provided on a surface of the frame that is opposite the surface thereof on which the base substrate is provided and transmits light emitted from the plurality of light emitting devices, and the frame is so dimensioned that the section modulus corresponding to the cross-sectional shape of the frame is greater than or equal to 0.5 mm$^3$ but smaller than or equal to 7.0 mm$^3$.

15 Claims, 5 Drawing Sheets

(56) References Cited

U.S. PATENT DOCUMENTS

| | | | |
|---|---|---|---|
| 2009/0213130 A1* | 8/2009 | Onodera | G03B 21/14 345/549 |
| 2010/0140655 A1* | 6/2010 | Shi | H01L 33/507 257/99 |
| 2010/0246159 A1* | 9/2010 | Wada | F21K 9/00 362/84 |
| 2011/0205744 A1* | 8/2011 | Kim | F21V 5/04 362/296.01 |
| 2011/0242806 A1* | 10/2011 | Ramer | H01L 33/44 362/235 |
| 2011/0280002 A1* | 11/2011 | Furukawa | G02F 1/133602 362/97.1 |
| 2012/0154681 A1* | 6/2012 | Morimoto | G03B 21/14 348/645 |
| 2012/0307481 A1* | 12/2012 | Joo | H01L 33/60 362/97.1 |
| 2013/0114254 A1* | 5/2013 | Nakamura | F21V 5/04 362/235 |
| 2014/0197528 A1* | 7/2014 | Nagata | H01L 33/58 257/680 |
| 2014/0240978 A1* | 8/2014 | Kim | F21V 15/01 362/235 |
| 2014/0246990 A1* | 9/2014 | Kim | H05B 33/0866 315/250 |
| 2014/0355269 A1* | 12/2014 | Ohno | F21V 17/16 362/269 |
| 2014/0376223 A1* | 12/2014 | Bergenek | H01L 33/504 362/235 |
| 2015/0003081 A1* | 1/2015 | Kobayashi | G02B 3/08 362/311.02 |
| 2015/0009649 A1* | 1/2015 | Jagt | H01L 33/507 362/84 |
| 2015/0036107 A1 | 2/2015 | Nagahara et al. | |
| 2015/0077989 A1* | 3/2015 | Hikmet | F21V 9/08 362/235 |

* cited by examiner

LIGHT SOURCE APPARATUS AND PROJECTOR

CROSS REFERENCE TO RELATED APPLICATION

The entire disclosure of Japanese Patent Application No. 2016-085193, filed Apr. 21 2016 is expressly incorporated by reference herein.

BACKGROUND

1. Technical Field

The present invention relates to a light source apparatus and a projector.

2. Related Art

A light emitting device, such as a light emitting diode and a semiconductor laser, used in a light source apparatus has a problem of decrease in reliability due to adhesion of foreign matter or moisture to the light emitting device. To avoid the problem, the light source apparatus is in some cases provided with a structure that isolates the light emitting device from the outside air. As a structure of this type, there is a known airtight sealing structure in which a package that serves as a lid is bonded to a substrate on which a light emitting device is mounted to seal the light emitting device, as described in JP-A-2015-45843.

The light source apparatus described in JP-A-2015-45843 includes a substrate having a phosphor, a plurality of semiconductor laser devices, a package, and an optical system for guiding the laser beams to the phosphor. In the light source apparatus, the plurality of semiconductor laser devices are accommodated in the package. The package includes a first base substrate made of copper, aluminum, or any other material, a second base substrate made of an aluminum nitride or any other material, a cap, and a light transmissive member made of glass or any other material.

In the light source apparatus described in JP-A-2015-45843, bonding among a plurality of members that form the package or bonding of the members that form the package to the substrate is performed in many cases by using brazing or a bonding material, such as low-melting-point glass. The bonding is performed at a high temperature, and the melted bonding material bonds the components described above to each other and then cures as the temperature thereof lowers. Since each of the members typically used to form the package has a positive coefficient of linear expansion, the members contract when the temperature thereof lowers. In this process, the light transmissive member made, for example, of glass undesirably breaks or falls off the package body.

SUMMARY

An advantage of some aspects of the invention is to provide a light source apparatus that can prevent breakage or falling of a light transmissive member. Another advantage of some aspects of the invention is to provide a projector that includes the light source apparatus and is therefore reliable.

A light source apparatus according to an aspect of the invention includes a base substrate, a frame so provided as to face a first surface of the base substrate, a light emitting device surrounded by the frame and provided on the first surface of the base substrate, and a light transmissive member so provided as to face a surface of the frame that is opposite a surface thereof facing the first surface of the base substrate, and the frame is so dimensioned that a section modulus corresponding to a cross-sectional shape of the frame is greater than or equal to 0.5 mm$^3$ but smaller than or equal to 7.0 mm$^3$.

In the light source apparatus according to the aspect of the invention, a plurality of light emitting devices are provided on the first surface of the base substrate, the frame is so provided as to surround the plurality of light emitting devices, and the light transmissive member is provided on the side opposite the base substrate with respect to the frame. That is, the frame is interposed between the light transmissive member and the base substrate.

Stress induced in the light transmissive member is therefore reduced by the frame. Further, since the frame is so dimensioned that the section modulus corresponding to the cross-sectional shape of the frame is greater than or equal to 0.5 mm$^3$ but smaller than or equal to 7.0 mm$^3$, the stress induced in the light transmissive member can be reduced to a point where the stress is lower than maximum allowable stress of the light transmissive member. As a result, breakage or falling of the light transmissive member can be avoided. Grounds for setting the numerals of the section modulus will be described later in detail.

In the light source apparatus according to the aspect of the invention, a coefficient of linear expansion of the frame may be smaller than a coefficient of linear expansion of the base substrate but greater than a coefficient of linear expansion of the light transmissive member.

According to the configuration described above, the coefficient of linear expansion of the frame is an intermediate value between the coefficient of linear expansion of the base substrate and the coefficient of linear expansion of the light transmissive member. The frame can therefore effectively reduce the stress in the light transmissive member.

In the light source apparatus according to the aspect of the invention, the frame may be made of a ceramic material.

In the case where the frame is made of a ceramic material, the coefficient of linear expansion of the frame is in general relatively closer to the coefficient of linear expansion of the light transmissive member than the coefficient of linear expansion of the base substrate. The frame can therefore sufficiently reduce the stress induced in the light transmissive member, whereby breakage or falling of the light transmissive member can be sufficiently suppressed.

In the light source apparatus according to the aspect of the invention, a length of the cross-sectional shape in a direction perpendicular to the first surface may be greater than or equal to 2.0 mm but smaller than or equal to 3.5 mm, and a length of the cross-sectional shape in a direction parallel to the first surface may be greater than or equal to 1.0 mm but smaller than or equal to 3.0 mm.

According to the configuration described above, the frame forms a space that accommodates the light emitting device between the base substrate and the light transmissive member, and a section modulus that makes the stress induced in the light transmissive member smaller than maximum allowable stress of the light transmissive member can be achieved. Grounds for setting the numerals will be described later in detail.

A projector according to another aspect of the invention includes the light source apparatus according to the aspect of the invention described above, a light modulator that modulates light outputted from the light source apparatus, and a projection system that projects light modulated by the light modulator.

The projector according to the other aspect of the invention includes the light source apparatus according to the aspect of the invention, whereby a reliable projector can be achieved.

The projector according to the other aspect of the invention may further include a wavelength conversion element that emits fluorescence when excited with the light outputted from the light source apparatus.

According to the configuration described above, a wavelength conversion element that emits fluorescence having a desired wavelength in accordance with the application of the projector can be selected. The projector according to the other aspect of the invention can therefore display an image having a desired color.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to FIGS. 1 to 5.

Figure 1:
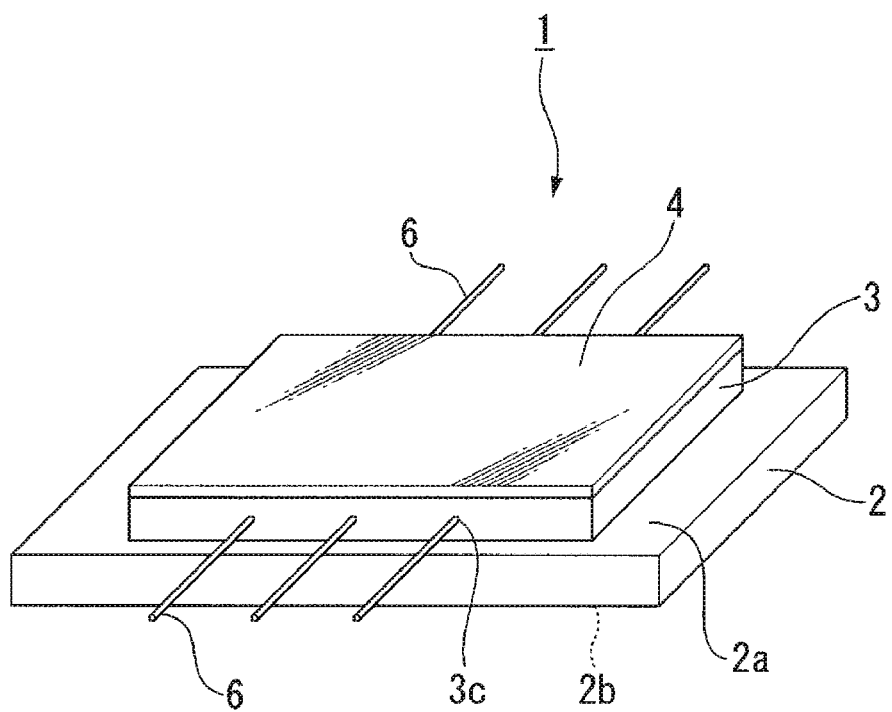
FIG. 1 is a perspective view of a light source apparatus according to an embodiment of the invention.
Figure 2:
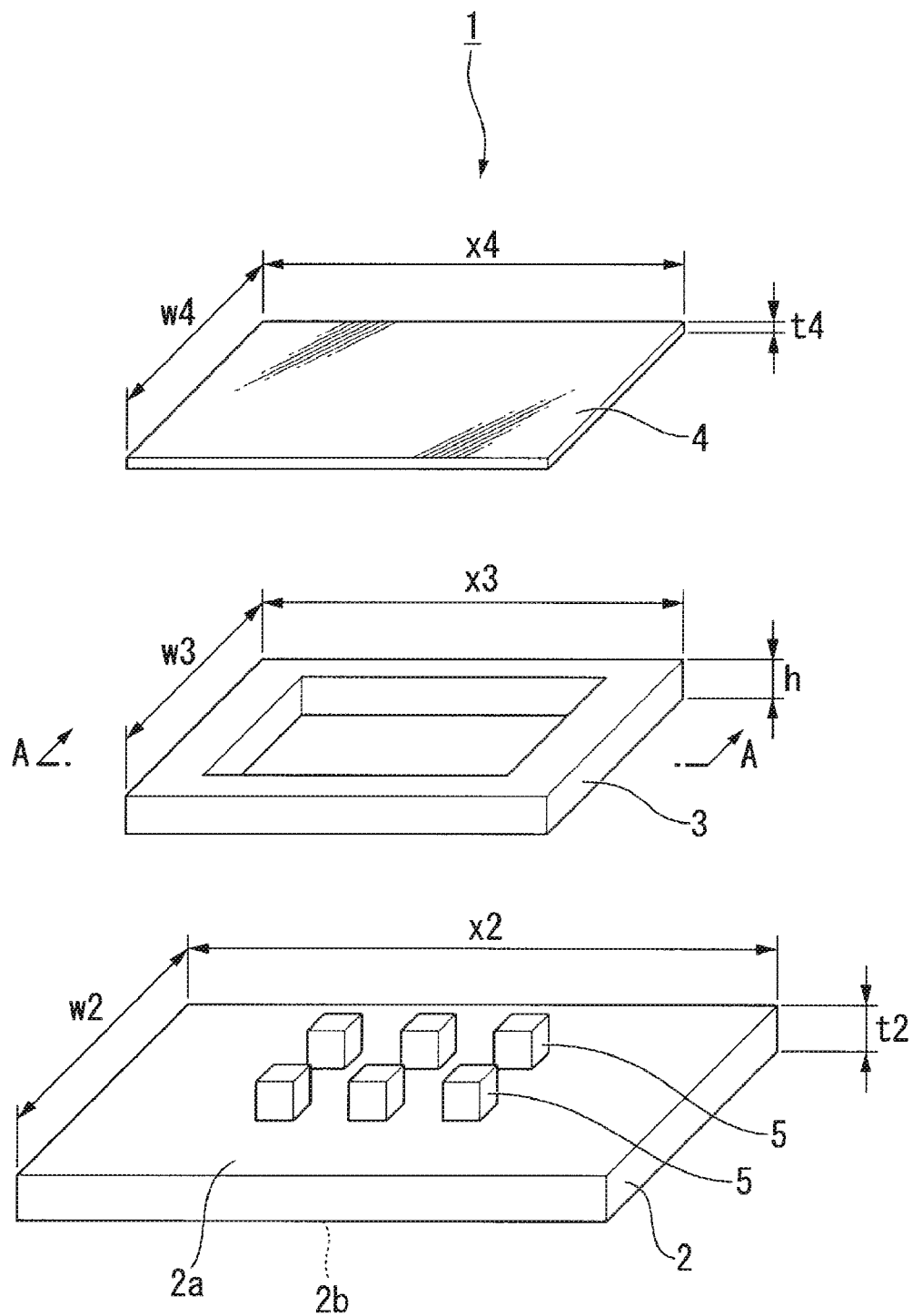
FIG. 2 is a perspective view showing the light source apparatus in an exploded state.

In the drawings used in the following description, each component may be drawn in different dimensional scales in some cases for ease of illustration of the component. Light source apparatus FIG. 1 is a perspective view of a light source apparatus according to an embodiment of the invention. FIG. 2 is a perspective view showing the light source apparatus in an exploded state. In FIG. 2, electrodes that are shown in FIG. 1 and will be described later are omitted.

A light source apparatus 1 includes a base 2 (base substrate), a plurality of light emitting devices 5, a frame 3, a light transmissive member 4, and a plurality of electrodes 6, as shown in FIGS. 1 and 2. In the light source apparatus 1, an accommodation space S (see FIG. 4), which is surrounded by the frame 3, the light transmissive member 4, and the base 2 and isolated from the exterior space, is provided on the side facing a first surface 2a of the base 2. The plurality of light emitting devices 5 are accommodated in the sealed accommodation space S. That is, the light source apparatus 1 according to the present embodiment has a form in which the plurality of light emitting devices 5 are accommodated in a single common package.

The base 2 is a plate-shaped member having the first surface 2a and a second surface 2b opposite the first surface 2a. The base 2 has a quadrangular shape, such as a roughly square or roughly oblong shape, in a plan view viewed along the direction of a normal to the first surface 2a. The plurality of light emitting devices 5 are provided on the first surface 2a of the base 2. A heat dissipater (not shown) for dissipating heat generated by the plurality of light emitting devices 5 is provided as appropriate on the second surface 2b of the base 2. To this end, the base 2 is made of a metal material having high thermal conductivity. As a metal material of this type, copper, aluminum, or any other suitable material is preferably used, and copper is particularly preferably used.

In the following description, the term simply written as a "plan view" means a plan view viewed along the direction of a normal to the first surface 2a of the base 2.

The base 2 has a quadrangular shape, such as a square or oblong shape, in the plan view, and the dimensions of two sides w2 and x2 of the quadrangular shape range, for example, from about 20 to 50 mm. The thickness t2 of the base 2 ranges from about 2 to 4 mm.

Each of the light emitting devices 5 is a solid-state light source, for example, a semiconductor laser and a light emitting diode. Each of the light emitting devices 5 may be a light emitting device that emits light having an arbitrary wavelength according to the application of the light source apparatus 1. For example, as a light emitting device 5 that emits blue light used to excite a phosphor and having a wavelength ranging from 430 to 490 nm, a semiconductor laser made of a nitride-based semiconductor ($In_XAl_YGa_{1-X-Y}N$, $0 \leq X \leq 1$, $0 \leq Y \leq 1$, $X+Y \leq 1$) can be used. In addition to the semiconductor material expressed by the general formula described above, for example, part of the group-III elements may be replaced with a boron atom, or part of the nitrogen atom as the V-group element may be replaced with a phosphorus atom or an arsenic atom.

The plurality of light emitting devices 5 are, for example, so configured that (m×n) (m and n are each a natural number greater than or equal to 2) semiconductor lasers are arranged in a lattice pattern formed of m rows and n columns. Specifically, for example, 25 semiconductor lasers are arranged in a lattice pattern formed of 5 rows and 5 columns. FIG. 2 shows only the semiconductor lasers arranged in the pattern formed of 2 rows and 3 columns. The light emitting devices 5 are bonded to the base 2 via a bonding material (not shown) with a surface of each of the light emitting devices 5 other than the light exit surface being in contact with the first surface 2a of the base 2. The bonding material is, for example, a solder material, such as a gold-tin solder material. The light emitting devices 5 may be directly bonded to the first surface 2a of the base 2 or may be bonded, for example, to an intermediate member called a sub-mount bonded to the first surface 2a of the base 2 via the bonding material.

The frame 3 is so provided on the first surface 2a of the base 2 as to surround the plurality of light emitting devices 5. The frame 3 has a quadrangular-ring-like shape in the plan view. The frame 3 may be a quadrangular member with the four sides thereof all integrated with each other, or part of the frame 3 may be a separate member bonded to the frame 3. The frame 3 keeps the distance (space) between the base 2 and the light transmissive member 4 fixed and contributes to part of the accommodation space S, which accommodates the plurality of light emitting devices 5. To this end, the frame 3 preferably has predetermined rigidity. Further, the frame 3 plays a role in reducing stress induced in the light transmissive member 4. To this end, the frame 3 is preferably made of a material having a coefficient of linear expansion lower than that of the base 2 but having a coefficient of linear expansion higher than that of the light transmissive member 4. As the material of the frame 3, a ceramic material, such as alumina, silicon carbide, and silicon nitride, is preferably used, and alumina is particularly preferably used.

Figure 3:
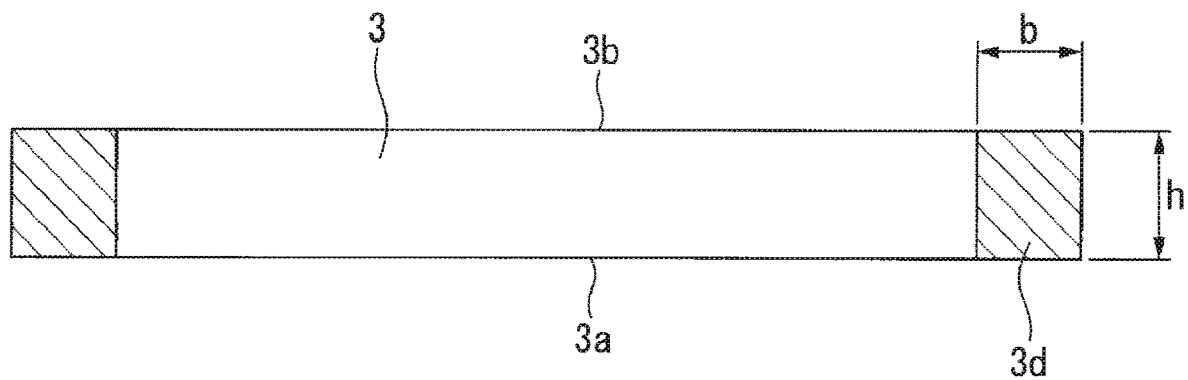
FIG. 3 is a cross-sectional view of a frame.

The frame 3 has a quadrangular shape in the plan view, and the dimensions of two sides w3 and x3 of the quadrangular shape range, for example, from about 20 to 40 mm. FIG. 3 is a cross-sectional view of the frame taken along the cross section A-A shown in FIG. 2. The frame 3 is so shaped that the cross-sectional shape 3d taken along the cross section A-A is, for example, a square, oblong, trapezoidal, or any other quadrangular shape, as shown in FIG. 3. The frame 3 has a first surface 3a, which is boned to the base 2, and a second surface 3b, to which the light transmissive member 4 is bonded. The first surface 3a and the second surface 3b are parallel to each other and smooth surfaces. The frame 3 is bonded to the first surface 2a of the base 2 via a bonding material (not shown). The bonding material is, for example, a solder material or low-melting-point glass.

In the present specification, the cross-sectional shape 3d of the frame 3 means a cross-sectional shape taken as follows: In the plan view of the frame 3, consider a portion where the inner side of the inner contour of the ring-shaped plan shape of the frame 3 and the outer side of the outer contour thereof are parallel to each other, and the portion is cut in a direction that intersects the inner side and the outer side at right angles. That is, the cross-sectional shape 3d of the frame 3 is the cross-sectional shape of the frame 3 taken along the cross section A-A.

The light transmissive member 4 is a light transmissive plate-shaped member. The light transmissive member 4 has a quadrangular shape including a square shape and an oblong shape in the plan view. The light transmissive member 4 is provided on the second surface 3b of the frame 3, which is the surface of the frame 3 that is opposite the first surface 3a, on which the base 2 is provided. The light transmissive member 4 has a quadrangular shape in the plan view, and the dimensions of two sides w4 and x4 of the quadrangular shape range, for example, from about 20 to 40 mm, which are roughly equal to the outer dimensions of the frame 3. The light transmissive member 4 has a thickness ranging from about 0.5 to 3.0 mm.

The light transmissive member 4 transmits the light emitted from the plurality of light emitting devices 5. To this end, the light transmissive member 4 is preferably made of a light transmissive material having high light transmittance. The light transmissive member 4 is specifically made, for example, of optical glass including borosilicate glass, such as BK7, quartz glass, and synthetic quartz glass, crystallized quartz, or sapphire. The light transmissive member 4 is bonded to the second surface 3b of the frame 3 via a bonding material (not shown). The bonding material is, for example, a solder material or low-melting-point glass. The light transmissive member 4 is a flat plate or may be a plate having one surface on which optical elements having a light collection function, such as lenses, are integrally formed.

The accommodation space S, which is surrounded by the base 2, the frame 3, and the light transmissive member 4, is a sealed space isolated from the outside air and prevents foreign matter and moisture from adhering to the light emitting devices 5. The accommodation space S preferably is a vacuum space. The accommodation space S may instead be filled with an inert gas, such as a nitrogen gas. The vacuum space is a space filled with a gas having pressure lower than the typical atmospheric pressure specified in JIS Z 8126. In the definition of the vacuum, the gas with which the accommodation space S is filled is preferably an inert gas.

A plurality of through holes 3c are provided in the frame 3, as shown in FIG. 1. The electrodes 6, which supply the plurality of light emitting devices 5 with electric power, are provided in the plurality of through holes 3c.

The electrodes 6 are made, for example, of Koval. A plated layer made, for example, of nickel-gold, is plated on the surface of each of the electrodes 6. Bonding wires (not shown) that electrically connect ends of the electrodes 6 to the terminals of the light emitting devices 5 are provided in the accommodation space S. The other ends of the electrodes 6 are connected to an external circuit (not shown). The gap between the inner wall of each of the through holes 3c in the frame 3 and the corresponding electrode 6 is filled with a sealing material. The sealing material is preferably, for example, low-melting-point glass.

To manufacture the light source apparatus 1 having the configuration described above, the following manufacturing method can, for example, be employed. It is, however, noted that the following manufacturing method is presented by way of example and the manufacturing method is not limited thereto.

First, brazing, low-melting-point glass welding or any other method is used to bond the frame 3 to the first surface 2a of the base 2. The heating temperature in this step is, for example, 300° C. The heating temperature of 300° C. is determined on the basis of the melting point of the bonding material that is used to bond the members described above to each other and will be described later. A heating environment temperature in a heating environment that heats the entire light source apparatus 1 is set to be higher than 300° C.

A bonding material, such as solder and low-melting-point glass, is then used to fix the plurality of light emitting devices 5 to the first surface 2a of the base 2. In this step, the plurality of light emitting devices 5 may be provided over the base 2 via a sub-mount, as described above. The step of bonding the frame 3 to the base 2 may precede the step of bonding the light emitting devices 5 to the base 2 or vice versa. However, carrying out the step of bonding the frame 3 to the base 2 first can prevent heat generated in the step of bonding the frame 3 to the base 2 from transferring to the light emitting devices 5.

The electrodes 6 are then inserted into the through holes 3c in the frame 3 and fixed thereto with a sealing material. This step may be carried out before the step of bonding the frame 3 to the base 2.

The light emitting devices 5 are then electrically connected to the electrodes 6 via the bonding wires. Specifically, ultrasonic bonding, thermocompression bonding, or any other method is used to bond ends of the bonding wires to the electrodes 6 and bond the other ends of the bonding wires to the terminals of the light emitting devices 5.

Brazing, low-melting-point glass welding, or any other method is then used to bond the light transmissive member 4 to the frame 3 bonded to the base 2. The heating temperature in this step is, for example, 300° C.

The light source apparatus 1 is completed by carrying out the steps described above.

Figure 4:
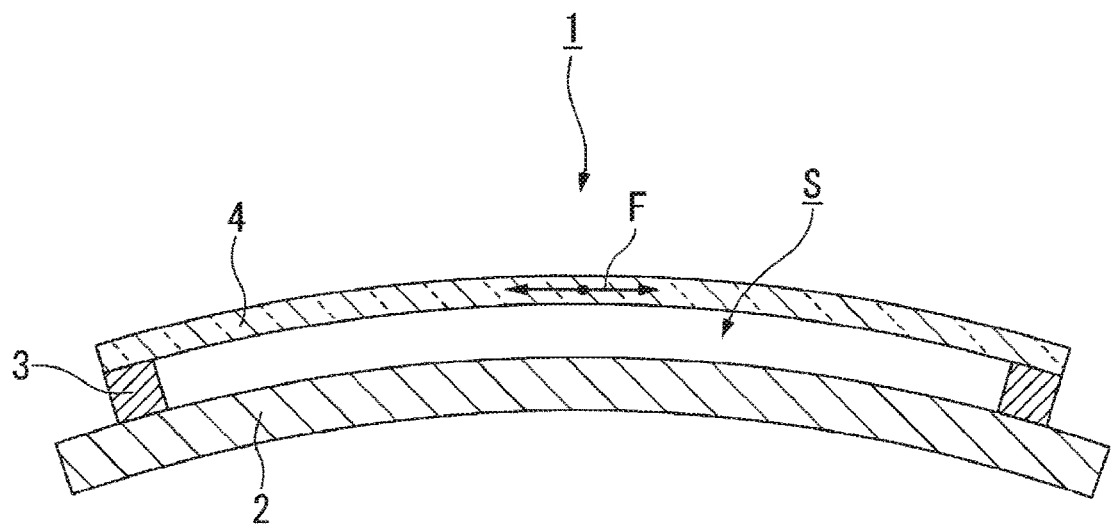
FIG. 4 is a diagrammatic view showing the behavior of the light source apparatus after heating followed by decrease in temperature.

In the bonding between the base 2 and the frame 3 and the bonding between the light transmissive member 4 and the frame 3, the bonding material, such as solder and low-melting-point glass, is melted, for example, at the temperature of about 300° C., and the temperature is lowered after the bonding to cure the bonding material, as described above. Since the materials of the base 2, the frame 3, and the light transmissive member 4 each have a positive coefficient of linear expansion, they contract when the temperature thereof lowers to a temperature close to the environment temperature after the heating steps described above. FIG. 4 shows the light source apparatus 1 after the base 2, the frame 3, and the light transmissive member 4 undergo the heat-based bonding and the temperature thereof then lowers.

The coefficient of linear expansion of the metal material used to form the base 2, such as copper and aluminum, ranges, for example, from about $1 \times 10^{-5}$ to $2 \times 10^{-5}/°$ C., whereas the coefficient of linear expansion of the material used to form the light transmissive member 4, such as glass, ranges, for example, from about $0.5 \times 10^{-6}$ to $9 \times 10^{-6}/°$ C. Since the materials of the base 2 and the light transmissive member 4 greatly differ from each other in terms of the coefficient of linear expansion, the amount of contraction of the base 2 in the process described above in which the temperature lowers is greater than the amount of contraction of the light transmissive member 4 in the same process.

As a result, the difference in the amount of contraction between the base 2 and the light transmissive member 4 causes the light source apparatus 1 to warp, resulting in stress F induced in the light transmissive member 4, as shown in FIG. 4. At this point, if the stress F exceeds maximum allowable stress specific to the material of which the light transmissive member 4 is made, the light transmissive member 4 breaks or falls off. In this case, the frame 3, which is interposed between the base 2 and the light transmissive member 4, provides an effect of reducing the stress F induced in the light transmissive member 4.

The present inventor has focused on the fact that the frame 3 provides the effect of reducing the stress F and the effect depends on the cross-sectional shape of the frame 3, has conducted a study on an optimum cross-sectional shape of the frame 3 from the viewpoint of avoidance of breakage or falling of the light transmissive member 4, and has conceived of the light source apparatus 1 according to the present embodiment.

Results of the study conducted by the present inventor will be described below.

First Example

Figure 5:
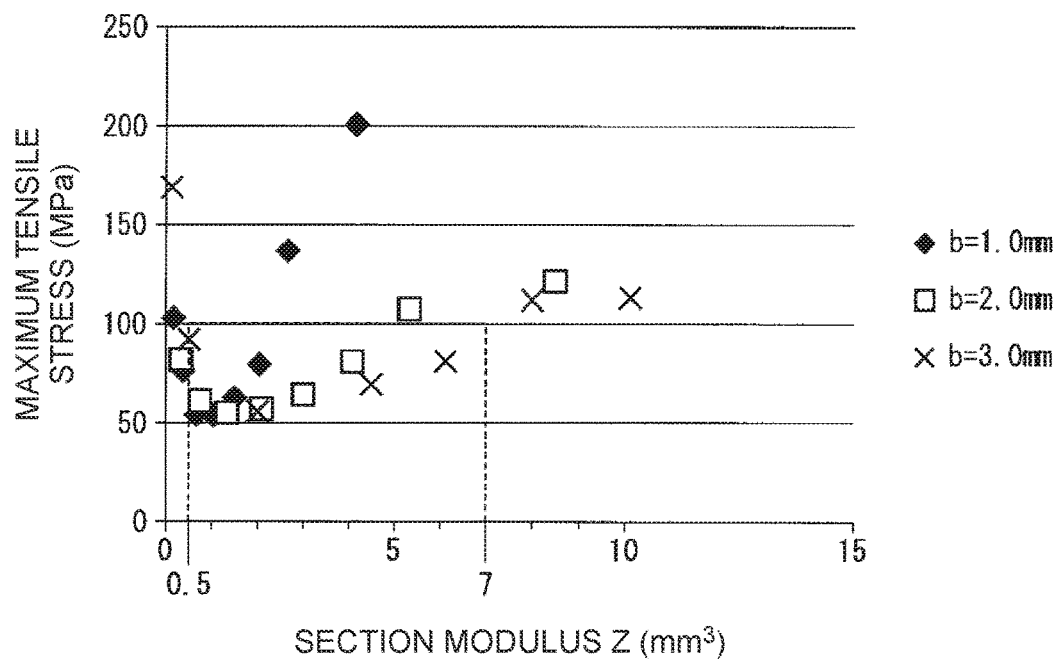
FIG. 5 shows results of a simulation in a first example and shows graphs illustrating the correlation between the section modulus of the frame and maximum tensile stress.

FIG. 5 shows graphs illustrating results of a simulation conducted by the present inventor in a first example. FIG. 5 shows the correlation between the section modulus Z of the frame 3 and maximum tensile stress induced in the light transmissive member 4. In FIG. 5, the horizontal axis represents the section modulus Z [$mm^3$], and the vertical axis represents the maximum tensile stress [MPa] in the light transmissive member 4. The section modulus Z is an index representing the degree of bend of a member on which a load acts and is frequently used, for example, in the material mechanics.

The conditions under which the simulation was conducted will be shown below. The reference characters representing the following dimensions are shown in FIGS. 2 and 3.

Material of base 2: Copper
Dimension of base 2 in plan view: x2=w2=40 [mm]
Thickness of base 2: t2=3 [mm]
Material of frame 3: Alumina
Dimension of frame 3 in plan view (outer shape): x3=w3=30 [mm]
Width of frame 3: b [mm]
Height of frame 3: h [mm]
Material of light transmissive member 4: BK7 (borosilicate glass)
Dimension of light transmissive member 4 in plan view: x4=w4=30 [mm]
Thickness of light transmissive member 4: 0.7 [mm]

Under the conditions described above, assuming cases where the width b of the frame 3 is 1.0 mm, 2.0 mm, and 3.0 mm, the height h of the frame 3 was changed over the range from 0.5 mm to 5.0 mm to change the section modulus Z.

As the temperature conditions, the heating temperature at which the base 2, the frame 3, and the light transmissive member 4 of the light source apparatus 1 are bonded to each other (melting point of bonding materials) was set at 300° C., and the temperature of the light source apparatus 1 after the heating followed by decrease in the temperature of the light source apparatus 1 was set at 25° C. (environment temperature). That is, the amount of change ΔT in the temperature of the light source apparatus 1 was 275° C.

In the present example, the cross-sectional shape 3*d* of the frame 3 is a roughly oblong shape, and the section modulus Z of the frame 3 having the cross-sectional shape 3*d* is therefore expressed by $Z = b \times h^2 / 6$, where b represent the width of the frame 3 and h represents the height thereof.

Table 1 shows physical properties of the materials described above.

TABLE 1

| Item | Unit | Copper | Optical Glass (BK7) | Alumina |
|---|---|---|---|---|
| Density | g/cm³ | 8.96 | 2.51 | 1.94 |
| Poisson ratio | — | 0.33 | 0.208 | 0.24 |
| Young's Modulus | MPa | 110000 | 82000 | 390000 |
| Coefficient of linear expansion | /° C. | $1.65 \times 10^{-5}$ | $7.00 \times 10^{-6}$ | $7.70 \times 10^{-6}$ |
| Tensile strength | MPa | — | 100 | — |

Tables 2 to 4 show simulated maximum tensile stress. Table 2 shows results of the maximum tensile stress in the case where the width b of the frame 3 is 1.0 mm. Table 3 shows results of the maximum tensile stress in the case where the width b of the frame 3 is 2.0 mm. Table 4 shows results of the maximum tensile stress in the case where the width b of the frame 3 is 3.0 mm. FIG. 5 shows the relationship between the section moduli Z and the maximum tensile stress shown in Tables 2 to 4. It is noted that the numerals of the section modulus Z and the maximum tensile stress in Tables 2 to 4 are rounded off to two decimal places and numerals to second decimal place are shown.

TABLE 2

| | | b = 1.0 | | | | | | | |
|---|---|---|---|---|---|---|---|---|---|
| Section modulus | mm³ | 0.17 | 0.38 | 0.67 | 1.04 | 1.50 | 2.04 | 2.67 | 4.17 |
| h | mm | 1 | 1.5 | 2 | 2.5 | 3 | 3.5 | 4 | 5 |

TABLE 2-continued

| | | \multicolumn{8}{c}{b = 1.0} |
|---|---|---|---|---|---|---|---|---|---|

| | | b = 1.0 | | | | | | | |
|---|---|---|---|---|---|---|---|---|---|
| Maximum tensile strength | MPa | 102.91 | 76.29 | 54.04 | 53.66 | 62.80 | 79.47 | 136.733 | 200.53 |

TABLE 3

| | | b = 2.0 | | | | | | | |
|---|---|---|---|---|---|---|---|---|---|
| Section modulus | mm³ | 0.33 | 0.75 | 1.33 | 2.08 | 3.00 | 4.08 | 5.33 | 8.33 |
| h | mm | 1 | 1.5 | 2 | 2.5 | 3 | 3.5 | 4 | 5 |
| Maximum tensile strength | MPa | 81.79 | 61.01 | 54.99 | 56.85 | 64.27 | 81.19 | 107.21 | 119.11 |

TABLE 4

| | | b = 3.0 | | | | | | |
|---|---|---|---|---|---|---|---|---|
| Section modulus | mm³ | 0.13 | 0.50 | 2.00 | 4.50 | 6.13 | 8.00 | 10.13 |
| h | mm | 0.5 | 1 | 2 | 3 | 3.5 | 4 | 4.5 |
| Maximum: tensile strength | MPa | 168.66 | 92.11 | 55.78 | 69.54 | 81.06 | 111.93 | 112.99 |

The width b of the frame 3 will first be described.

In the method for manufacturing the light source apparatus 1 described above, after the frame 3 is bonded to the first surface 2a of the base 2, and when the light transmissive member 4 is bonded to the second surface 3b, which is the surface opposite the first surface 3a to which the base is bonded, the bonding of the light transmissive member 4 is performed with the light transmissive member 4 heated and the light transmissive member 4 pressed against the base 2 and the frame 3. In the pressing process, if the width b of the frame 3 is smaller than 1.0 mm, the frame 3 cannot withstand the pressing pressure, possibly resulting in breakage of the frame 3. Further, in the manufacture of the frame 3 itself, when the through holes 3c, through which the electrodes 6 are inserted, are formed, the frame 3 could undesirably break because the width b of the frame 3 is too small. The lower limit of the width b of the frame 3 is therefore preferably 1.0 mm.

Further, in the light source apparatus 1, the plurality of light emitting devices 5 are provided on the first surface 2a of the base 2, as described above. The light source apparatus 1 is desired to achieve high luminance by provision of the plurality of light emitting devices 5 and simultaneously achieve reduction in the size of the light source apparatus 1 and reduction in the amount of heat generated by the plurality of light emitting devices 5 (improvement in heat dissipation). In the light source apparatus 1 according to the present example, in the case where the plurality of light emitting devices 5 are provided on the base 2 and the width b of the frame 3 is greater than 3.0 mm, the interval between the light emitting devices 5 decreases, and the amount of heat generated per unit area therefore increases, possibly resulting in deterioration in the heat dissipation performance and hence degradation of the light source apparatus 1. The upper limit of the width b of the frame 3 is therefore preferably 3.0 mm.

As described above, the height h and the section modulus Z of the frame 3 may be set under the condition that the width b of the frame 3 is greater than or equal to 1.0 mm but smaller than or equal to 3.0 mm (1.05≤b≤3.0).

The maximum tensile stress tends to decrease over the range of the section modulus Z of the frame 3 from 0 to a predetermined value but tends to increase in the range of the section modulus Z greater than or equal to the predetermined value, as shown in FIG. 5. The tendency can be seen in all the cases where the width b of the frame 3 is 1.0 mm, 2.0 mm, and 3.0 mm. The tensile strength of BK7, which is the material of the light transmissive member 4 in the present example, is 100 MPa. Therefore, as long as the frame 3 has a section modulus that satisfies the condition that the maximum tensile stress is smaller than or equal to 100 MPa, the breakage or falling of the light transmissive member 4 can be avoided.

A preferable range of the height h of the frame 3 will next be examined.

In a case where the semiconductor lasers as the light emitting devices 5 are so disposed that the light emitting end surfaces of the semiconductor lasers are perpendicular to the first surface 2a of the base 2, an optical member, for example a prism (not shown), for deflecting the light emitted horizontally from the semiconductor lasers toward the light transmissive member 4 is required. To this end, the arrangement described above, which allows the height of the semiconductor lasers from the first surface 2a to be lowered, requires a height of at least 2 mm that allows the prism to be accommodated in the accommodation space S. On the other hand, in a case where the semiconductor lasers are so disposed that the light emitting end surfaces of the semiconductor lasers are parallel to the first surface 2a of the base, since the light from the semiconductor lasers travels in the direction perpendicular to the first surface 2a of the base, the optical member described above, such as a prism, is not required. In this arrangement, however, the height of the semiconductor lasers from the first surface 2a increases, and the height of the accommodation space S is therefore required to be at least 2 mm.

On the basis of the results of the simulation, in the case where the height h of the frame 3 is 1.0 mm, the condition that the maximum tensile stress is smaller than or equal to 100 MPa is satisfied depending on the width b of the frame 3. In consideration of the height of the accommodation space S from the viewpoint of the structure thereof described above, however, the lower limit of the height h of the frame 3 is preferably 2.0 mm.

On the other hand, the upper limit of the height h of the frame 3 is preferably set at about 10 mm or smaller on the basis of the interval between the plurality of semiconductor lasers as the plurality of light emitting devices 5, the arrangement of collimator lenses that parallelize the light emitted from the semiconductor lasers and incident on the collimator lenses, and other factors. The collimator lenses are, for example, so provided as to be adjacent to the light transmissive member 4 or configured as part of the light transmissive member 4. On the other hand, on the basis of the results of the simulation, in all the cases where the width b of the frame 3 is 1.0 mm, 2.0 mm, and 3.0 mm in Tables 2 to 4, the maximum tensile stress in a case where the height h of the frame 3 is 4.0 mm does not satisfy the condition that the maximum tensile stress is smaller than or equal to 100 MPa, and the height h therefore needs to be smaller than 4.0 mm. Therefore, in all the cases where the width b of the frame 3 is 1.0 mm, 2.0 mm, and 3.0 mm in Tables 2 to 4, the height of the frame 3 that satisfies the condition that the maximum tensile stress is smaller than or equal to 100 MPa is 3.5 mm. As a result, the upper limit of the height h of the frame is preferably 3.5 mm on the basis of the results of the simulation in Tables 2 to 4.

On the basis of the result of the examination described above, the height h of the frame 3 is preferably greater than or equal to 2.0 mm but smaller than or equal to 3.5 mm (2.0≤h≤3.5).

The section modulus Z [mm³] that satisfies the condition that the maximum tensile stress is smaller than or equal to 100 MPa is therefore preferably greater than or equal to 0.5 but smaller than or equal to 7.0 (0.5≤Z≤7.0) on the basis of the results of the simulation in Tables 2 to 4 and the upper limits and the lower limits of the width and the height of the frame 3 described above.

The results of the simulation described above are summarized below. Designing the cross-sectional shape 3d of the frame 3 in such a way that the height h of the frame 3 is greater than or equal to 2.0 mm but smaller than or equal to 3.5 mm and the width b of the frame 3 is greater than or equal to 1.0 mm but smaller than or equal to 3.0 mm allows the section modulus Z to be set at a value greater than or equal to 0.5 mm³ but smaller than or equal to 7.0 mm³. That is, in the case where the length of the cross-sectional shape 3d of the frame 3 in the direction perpendicular to the first surface 2a of the base 2 (height h) is greater than or equal to 2.0 mm but smaller than or equal to 3.5 mm and the length of the cross-sectional shape 3d of the frame 3 in the direction parallel to the first surface 2a of the base 2 (width b) is greater than or equal to 1.0 mm but smaller than or equal to 3.0 mm, the maximum tensile stress in the light transmissive member 4 is smaller than or equal to 100 MPa, which is the tensile strength of optical glass. The stress F induced in the light transmissive member 4 can therefore be reduced to a value smaller than or equal to the allowable stress. As a result, breakage or falling of the light transmissive member 4 can be avoided.

In the simulation described above, the lengths w3 and x3 of the sides of the frame 3 are each 30 mm. The present inventor has, however, ascertained that the simulation results provided in the case where the lengths w3 and x3 of the sides of the frame 3 are each 30 mm are also provided as long as the lengths w3 and x3 of the sides of the frame 3 fall within the range from 20 to 40 mm.

Second Example

Figure 6:
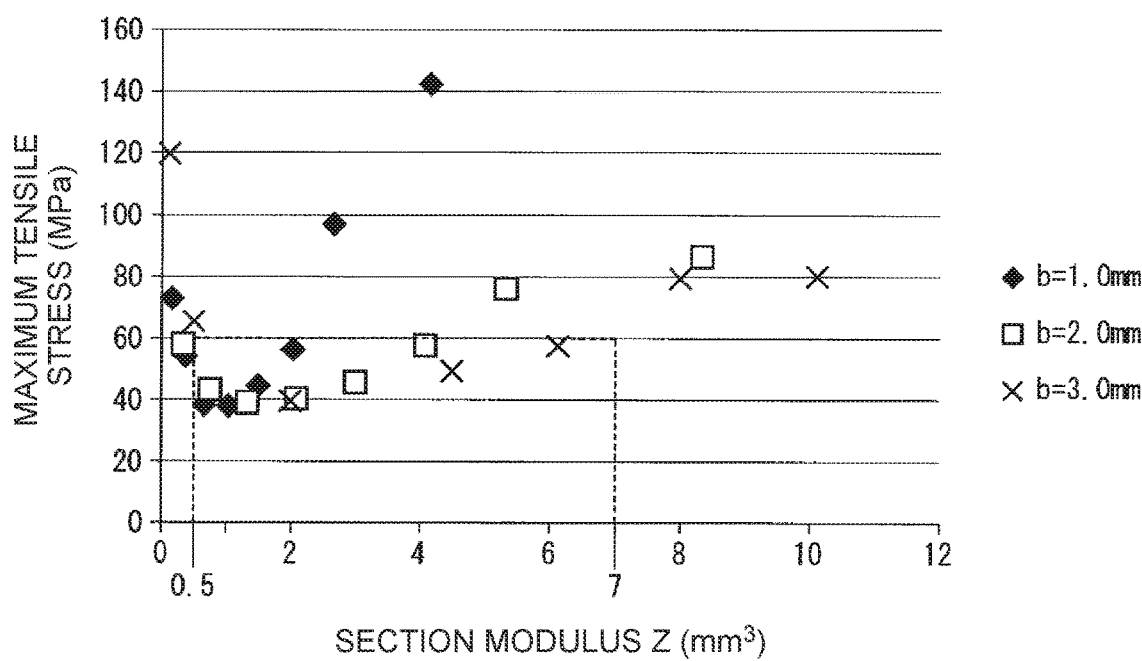
FIG. 6 shows results of a simulation in a second example and shows graphs illustrating the correlation between the section modulus of the frame and maximum tensile stress.

FIG. 6 shows graphs illustrating results of a simulation in a second example conducted by the present inventor. FIG. 6 shows the correlation between the section modulus Z of the frame 3 and the maximum tensile stress induced in the light transmissive member 4, as in FIG. 5. In FIG. 6, the horizontal axis represents the section modulus [mm³] of the frame 3, and the vertical axis represents the maximum tensile stress [MPa] in the light transmissive member 4.

In the first example, BK7 (borosilicate glass) is used as the material of the light transmissive member 4. The second example differs from the first example in that quartz glass is used as the material of the light transmissive member.

The physical properties of quartz glass are as follows: The density is 2.2 g/cm³; the Poisson ratio is 0.18; Young's modulus is 74000 MPa; the coefficient of linear expansion is $5.8 \times 10^{-7}$/° C.; and the tensile strength is 60 MPa. The strength of quartz glass is therefore lower than that of BK7. Therefore, to reduce the amount of contraction of each member due to decrease in the temperature in the method for manufacturing the light source apparatus 1, it is assumed in the second example to use a bonding material having a melting point lower than that in the first embodiment, that is, the heating temperature used when the base 2, the frame 3, and the light transmissive member 4 are bonded to each other (melting point of bonding material) was set at 220° C., and the temperature of the light source apparatus 1 after the temperature decreases was set at 25° C., which is the same environment temperature in the first example. That is, the amount of change ΔT in the temperature of the light source apparatus 1 was changed to 195° C. The other simulation conditions are the same as those in the first example.

Tables 5 to 7 show simulated maximum tensile stress. Table 5 shows results of the maximum tensile stress in the case where the width b of the frame 3 is 1.0 mm. Table 6 shows results of the maximum tensile stress in the case where the width b of the frame 3 is 2.0 mm. Table 7 shows results of the maximum tensile stress in the case where the width b of the frame 3 is 3.0 mm. FIG. 6 shows the relationship between the section moduli Z and the maximum tensile stress shown in Tables 5 to 7. It is noted that the numerals of the section modulus Z and the maximum tensile stress in Tables 5 to 7 are rounded off to two decimal places, and numerals to second decimal place are shown, as in Tables 2 to 4.

TABLE 5

| | | b = 1.0 | | | | | | | |
|---|---|---|---|---|---|---|---|---|---|
| Section modulus | mm³ | 0.17 | 0.38 | 0.67 | 1.04 | 1.50 | 2.04 | 2.67 | 4.17 |
| h | mm | 1 | 1.5 | 2 | 2.5 | 3 | 3.5 | 4 | 5 |
| Maximum tensile strength | MPa | 72.97 | 54.10 | 38.32 | 38.05 | 44.53 | 56.35 | 96.36 | 142.19 |

TABLE 6

| | | b = 2.0 | | | | | | | |
|---|---|---|---|---|---|---|---|---|---|
| Section modulus | mm³ | 0.33 | 0.75 | 1.33 | 2.08 | 3.00 | 4.08 | 5.33 | 8.33 |
| h | mm | 1 | 1.5 | 2 | 2.5 | 3 | 3.5 | 4 | 5 |
| Maximum tensile strength | MPa | 57.99 | 43.26 | 38.99 | 40.31 | 45.58 | 57.57 | 76.02 | 84.46 |

TABLE 7

| | | b = 3.0 | | | | | | |
|---|---|---|---|---|---|---|---|---|
| Section modulus | mm³ | 0.13 | 0.50 | 2.00 | 4.50 | 6.13 | 8.00 | 10.13 |
| h | mm | 0.5 | 1 | 2 | 3 | 3.5 | 4 | 4.5 |
| Maximum tensile strength | MPa | 119.59 | 65.31 | 39.55 | 49.31 | 57.48 | 79.37 | 80.12 |

Also in the second example, the maximum tensile stress tends to decrease over the range of the section modulus Z of the frame 3 from 0 to a predetermined value but tends to increase in the range of the section modulus Z greater than or equal to the predetermined value, as in the first example, as shown in FIG. 6. The tendency can be seen in all the cases where the width b of the frame 3 is 1.0 mm, 2.0 mm, and 3.0 mm. The tensile strength of quartz glass, which is the material of the light transmissive member 4 in the present example, is 60 MPa. Therefore, as long as the frame 3 has a section modulus that satisfies the condition that the maximum tensile stress is smaller than or equal to 60 MPa, the breakage or falling of the light transmissive member 4 can be avoided.

The section modulus Z [mm³] that satisfies the condition that the maximum tensile stress is smaller than or equal to 60 MPa is therefore preferably greater than or equal to 0.5 but smaller than or equal to 7.0 ($0.5 \leq Z \leq 7.0$) on the basis of the results of the simulation in Tables 5 to 7 and the upper limits and the lower limits of the width and the height of the frame 3 described above. That is, in the case where the length of the cross-sectional shape 3d of the frame 3 in the direction perpendicular to the first surface 2a of the base 2 (height h) is greater than or equal to 2.0 mm but smaller than or equal to 3.5 mm and the length of the cross-sectional shape 3d of the frame 3 in the direction parallel to the first surface 2a of the base 2 (width b) is greater than or equal to 1.0 mm but smaller than or equal to 3.0 mm, the maximum tensile stress in the light transmissive member 4 is smaller than or equal to 60 MPa, which is the tensile strength of quartz glass.

As described above, the preferable range of the section modulus Z in the present example is equal to that in the first example. Therefore, even when the light transmissive member 4 made of quartz glass, the strength of which is lower than that of BK7, is used, it is found that use of a bonding material having a low melting point reduces the amount of contraction of each member as compared with the case where BK7 is used and breakage or falling of the light transmissive member 4 can therefore be avoided.

In the first and second examples, the case where BK7 or quartz glass is used as the material of the light transmissive member 4 is presented. Instead, reinforced glass, for example, soda glass or low-expansion borosilicate glass that undergoes surface reinforcement can be used as the material of the light transmissive member 4. Similarly, crystallized quartz or sapphire, the tensile strength of which is higher than those of optical glass (BK7) and quartz glass, can be used. In this case, the upper limit of the height h of the frame 3 can be set at a value greater than 3.5 mm as long as the width b of the frame 3 is greater than or equal to 1.0 mm but smaller than or equal to 3.0 mm as in the first and second examples.

Projector

An example of a projector according to the present embodiment will be described below, but the present embodiment is not limited thereto.

Figure 7:
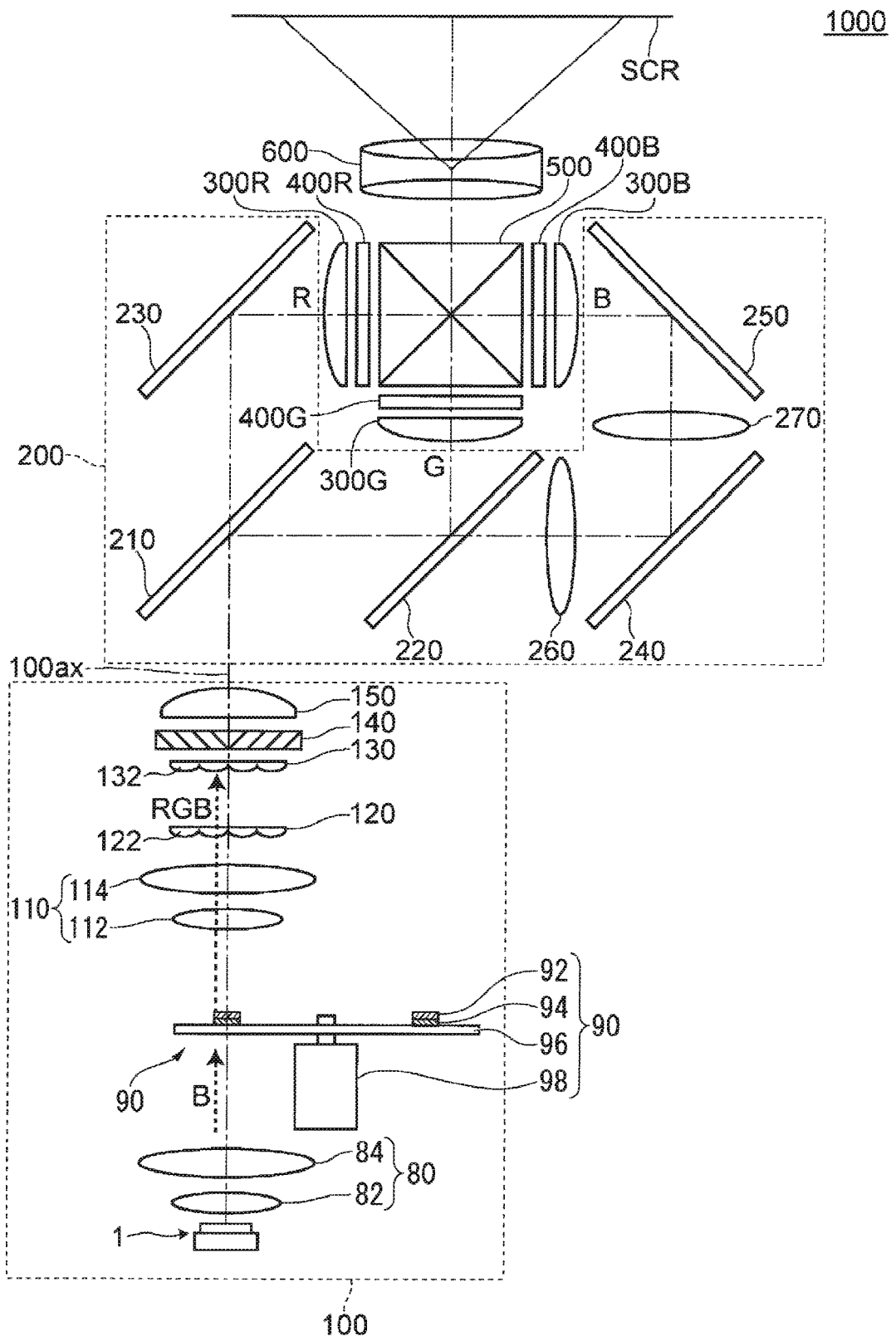
FIG. 7 is a schematic configuration diagram showing a projector according to an embodiment of the invention.

FIG. 7 is a schematic configuration diagram showing a projector 1000 according to the present embodiment.

The projector 1000 includes an illuminator 100, a color separation/light guiding system 200, three liquid crystal light valves 400R, 400G, and 400B as light modulators, a cross dichroic prism 500, and a projection system 600, as shown in FIG. 7.

The illuminator 100 includes a light source apparatus 1, a light focusing system 80, a wavelength conversion element 90, a collimation system 110, a first lens array 120, a second lens array 130, a polarization conversion element 140, and a superimposing lens 150, The light source apparatus 1 can be the light source apparatus 1 described above. The light source apparatus 1 outputs, for example, blue light B toward the light focusing system 80.

The light focusing system 80 includes a first lens 82 and a second lens 84. The light focusing system 80 is disposed in the optical path from the light source apparatus 1 to the wavelength conversion element 90 and causes the blue light B roughly focused as a whole to be incident on a wavelength conversion layer 92, which will be described later. Each of the first lens 82 and the second lens 84 is formed of a convex lens.

The wavelength conversion element 90 is what is called a transmissive wavelength conversion element, and the wavelength conversion monolayer 92 is continuously formed on part of a disk 96, which can be rotated by a motor 98, along the circumferential direction of the disk 96. The wavelength conversion element 90 is configured to convert the blue light B into fluorescence containing red light R and green light G and causes the fluorescence to exit toward the side opposite the side on which the blue light B is incident.

The disk 96 is made of a material that transmits the blue light B. As the material of the disk 96, for example, quartz glass, crystallized quarts, sapphire, optical glass, or transparent resin can be used.

The blue light B from the light source apparatus 1 is incident on the wavelength conversion element 90 from the side facing the disk 96.

The wavelength conversion layer 92 is formed on the disk 96 via a dichroic film 94, which transmits the blue light B but reflects the red light R and the green light G. The dichroic film 94 is formed, for example, of a dielectric multilayer film.

The wavelength conversion layer 92 converts part of the blue light B outputted from the light source apparatus 1 and having a wavelength of about 445 nm into the fluorescence to output it, but does not convert the remainder of the blue light B but causes it to pass through the wavelength conversion layer 92. That is, the wavelength conversion layer 92 is excited with the light outputted from the light source apparatus 1 and emits the fluorescence. The light source apparatus 1, which outputs the excitation light, and the wavelength conversion layer 92 can thus be used to produce desired color light. The wavelength conversion layer 92 is formed of a layer containing, for example, $(Y,Gd)_3(Al,Ga)_5O_{12}:Ce$, which is an example of a YAG-based phosphor, and an organic binder.

The collimation system 110 includes a first lens 112 and a second lens 114, each of which is formed of a convex lens. The collimation system 110 roughly parallelizes the light from the wavelength conversion element 90.

The first lens array 120 has a plurality of first lenslets 122 for dividing the light from the collimation system 110 into a plurality of sub-light fluxes. The plurality of first lenslets 122 in the first lens array 120 are arranged in a matrix in a plane perpendicular to an illumination optical axis 100ax.

The second lens array 130 has a plurality of second lenslets 132 arranged in a matrix in a plane perpendicular to the illumination optical axis 100ax. The plurality of second lenslets 132 are provided in correspondence with the plurality of first lenslets 122 in the first lens array 120. The second lens array 130, along with the superimposing lens 150, brings images of the first lenslets 122 in the first lens array 120 into focus in the vicinity of image formation regions of the liquid crystal light valves 400R, 400G, and 400B.

The polarization conversion element 140 is a polarization conversion element that aligns the polarization directions of the divided sub-light fluxes from the first lens array 120 with one another into a single polarization direction and outputs the sub-light fluxes as substantially one type of linearly polarized light. The polarization conversion element 140 includes a polarization separation layer, a reflection layer, and a retardation plate. The polarization separation layer, which receives the polarized light components contained in the light from the wavelength conversion element 90, directly transmits one linearly polarized light component and reflects another linearly polarized light component in the direction perpendicular to the illumination optical axis 100ax. The reflection layer reflects the other linearly polarized light component reflected off the polarization separation layer in the direction parallel to the illumination optical axis 100ax. The retardation plate converts the other linearly polarized light component reflected off the reflection layer into the one linearly polarized light component.

The superimposing lens 150 collects the sub-light fluxes from the polarization conversion element 140 and superimposes the collected sub-light fluxes on one another in the vicinity of the image formation regions of the liquid crystal light valves 400R, 400G, and 400B.

The first lens array 120, the second lens array 130, and the superimposing lens 150 form an optical integration system that homogenizes the in-plane light intensity distribution of the light from the wavelength conversion element 90.

The color separation/light guiding system 200 includes a dichroic mirror 210, a dichroic mirror 220, a reflection mirror 230, a reflection mirror 240, a reflection mirror 250, a relay lens 260, and a relay lens 270. The color separation/light guiding system 200 separates the light from the illuminator 100 into the red light R, the green light G, and blue light B and guides the color light fluxes, the red light R, the green light G, and blue light B, to the liquid crystal light valves 400R, 400G, and 400B, respectively, which are targets to be illuminated.

Field lenses 300R, 300G, and 300B are disposed between the color separation/light guiding system 200 and the liquid crystal light valves 400R, 400G, 400B, respectively.

The dichroic mirror 210 transmits a light component formed of the red light R and reflects a light component formed of the green light G and a light component formed of the blue light B toward the dichroic mirror 220. The dichroic mirror 220 reflects the light component formed of the green light G toward the field lens 300G and transmits the light component formed of the blue light B.

The red light R having passed through the dichroic mirror 210 is reflected off the reflection mirror 230, passes through the field lens 300R, and impinges on the image formation region of the liquid crystal light valve 400R for the red light R.

The green light G reflected off the dichroic mirror 210 is further reflected off the dichroic mirror 220, passes through the field lens 300G, and impinges on the image formation region of the liquid crystal light valve 400G for the green light G.

The blue light B having passed through the dichroic mirror 220 travels via the relay lens 260, the light-incident-side reflection mirror 240, the relay lens 270, the light-exiting-side reflection mirror 250, and the field lens 300B and impinges on the image formation region of the liquid crystal light valve 400B for the blue light B.

The liquid crystal light valves 400R, 400G, and 400B modulate the light outputted from the light source apparatus 1. The liquid crystal light valves modulate the color light fluxes incident thereon in accordance with image information to form a color image and are targets to be illuminated by the illuminator 100.

Although not shown, a light-incident-side polarizer and a light-exiting-side polarizer are provided on the light incident side and the light exiting side of the liquid crystal light valve 400R, respectively. The same holds true for the liquid crystal light valves 400G and 400B.

The cross dichroic prism 500 combines the image light fluxes outputted from the liquid crystal light valves 400R, 400G, and 400B with one another to form a color image. The cross dichroic prism 500 is formed by bonding four rectangular prisms and thus has a roughly square shape in a plan view, and dielectric multilayer films are formed on the roughly X-shaped interfaces between the bonded rectangular prisms.

The projection system 600 projects the color image formed by the liquid crystal light valves 400R, 400G, and 400B on a screen SCR.

The projector 1000, which includes the light source apparatus 1 described above, can display an image that is reliable and has desired brightness. Further, the projector 1000, which includes the wavelength conversion element 90, can display an image having a desired color. The phosphor does not necessarily emit yellow fluorescence but may emit fluorescence having any other color. For example, a phosphor that emits red fluorescence or a phosphor that emits green fluorescence may be used. A wavelength conversion element that emits fluorescence having an arbitrary color can be selected in accordance with the application of the projector.

The technical range of the invention is not limited to the embodiment described above, and a variety of changes can be made thereto to the extent that the changes do not depart from the substance of the invention.

For example, in the embodiment described above, the case where the frame 3, the cross-sectional shape 3*d* of which is an oblong shape (width: b, height: h), is used is presented by way of example, but the cross-sectional shape of the frame may instead be a quadrangular shape other than an oblong shape. For example, in a case where the frame has a tapered cross-sectional shape the dimension of which decreases from the first surface toward the second surface, the cross-sectional shape may be considered as a trapezoid having an upper base dimension a, a lower base dimension b, and a height dimension h, and a section modulus Z expressed by $Z=h^2(a^2+4ab+b^2)/\{12(a+2b)\}$ may be used. However, in a case where the degree of the taper is small and the value a and the value b hardly differ from each other, the cross-sectional shape may be considered as an approximation to be an oblong having the width a or b and the height h instead of a trapezoid. Instead, the cross-sectional shape may be considered as an approximation to be an oblong having a width of the average of the value a and the value b and the height h.

The configuration in which the light transmissive member 4 is bonded to the second surface 3*b* of the frame 3 may be replaced with a configuration in which a stepped portion lower than the second surface toward the first surface of the frame is formed on the inner circumference side of the frame and the light transmissive member 4 is fit onto the stepped portion and bonded to the frame. In this case, the cross-sectional shape of the frame is a quadrangular shape with one corner so cut to form a concave rectangular contour. In this case, since it is considered that the thickness of the light transmissive member is sufficiently small as compared with the height of the frame and the size of the cut portion is sufficiently small as compared with the size of the entire cross-sectional shape of the frame, the cross-sectional shape may be considered as an approximation to be the oblong without the cut portion.

Further, the frame is not necessarily an integral component and may instead be a laminate of a plurality of members laminated in the direction of the height h. For example, the frame may be formed of two members separate from each other at the position of the through holes into which the electrodes 6 are inserted. In this case, when the cross-sectional shape of the entire frame is, for example, an oblong shape, a section modulus corresponding to the oblong shape may be used.

In the embodiment described above, the case where the invention is applied to the transmissive projector has been described by way of example, and the invention is also applicable to a reflective projector. The term "transmissive" used herein means that a liquid crystal light valve including a liquid crystal panel used in the projector transmits light. The term "reflective" means that the liquid crystal light value reflects light. Each of the light modulators is not limited to a liquid crystal light valve and may, for example, be a digital mirormirror device.

In the embodiment described above, the projector 1000 using the three liquid crystal panels 400R, 400G, and 400B has been presented by way of example. The invention is also applicable to a projector using only one liquid crystal light valve or a projector using four or more liquid crystal light valves.

In the embodiment described above, the light source apparatus including a transmissive wavelength conversion element has been presented by way of example, but the light source apparatus may instead include a reflective wavelength conversion element. Further, the case where the light source apparatus includes the wavelength conversion element has been presented by way of example, but the light source apparatus may include no wavelength conversion element. In this case, the light source apparatus described above may be used as at least one of a light source apparatus that outputs red light, a light source apparatus that outputs green light, and a light source apparatus that outputs blue light as the light source apparatus of the projector.

Further, in the embodiment described above, the case where the light source apparatus according to the embodiment of the invention is incorporated in a projector has been presented by way of example, but not necessarily. The light source apparatus according to the embodiment of the invention can be used in a lighting apparatus, an automobile headlamp, and other apparatus.

What is claimed is:

1. A light source apparatus comprising:
   a base substrate is made of a metal material;
   a frame so provided as to face a first surface of the base substrate, wherein the frame is made of a ceramic material;
   a light emitting device surrounded by the frame and provided on the first surface of the base substrate; and
   a light transmissive member so provided as to face a surface of the frame that is opposite a surface thereof facing the first surface of the base substrate, wherein the frame is so dimensioned that a section modulus of a cross-section of the frame is greater than or equal to 0.5 mm3 but smaller than or equal to 7.0 mm3, wherein the section modulus Z of the frame is expressed by Z=bxh2/6, where b represent the width of the frame and h represents the height of the frame, wherein the cross-section of the frame is defined as including the entirety of the height h along with the entirety of the width b; and
   wherein a coefficient of linear expansion of the frame is smaller than a coefficient of linear expansion of the base substrate but greater than a coefficient of linear expansion of the light transmissive member.

2. The light source apparatus according to claim 1, wherein the height and the section modulus of the frame is set such that the width b of the frame is greater than or equal to 1.0 mm but smaller than or equal to 3.0 mm (1.0≤b≤3.0), and the height h of the frame is greater than or equal to 2.0 mm but smaller than or equal to 3.5 mm (2.0≤h≤3.5).

3. The light source apparatus according to claim 2, wherein the section modulus Z satisfies a condition that a maximum tensile stress in the light transmissive member is smaller than or equal to 100 MPa is therefore greater than or equal to 0.5 but smaller than or equal to 7.0 (0.5≤Z≤7.0).

4. The light source apparatus according to claim 1, wherein the height and the section modulus of the frame is set such that the width b of the frame is greater than or equal to 1.0 mm but smaller than or equal to 3.0 mm (1.0≤b≤3.0), and the height h of the frame is greater than or equal to 2.0 mm but smaller than or equal to 3.5 mm (2.0≤h≤3.5).

5. The light source apparatus according to claim 4, wherein the section modulus Z satisfies a condition that a maximum tensile stress in the light transmissive member is smaller than or equal to 100 MPa is therefore greater than or equal to 0.5 but smaller than or equal to 7.0 (0.5≤Z≤7.0).

6. The light source apparatus according to claim 1, wherein the section modulus Z satisfies a condition that a maximum tensile stress in the light transmissive member is smaller than or equal to 100 MPa is therefore greater than or equal to 0.5 but smaller than or equal to 7.0 (0.5≤Z≤7.0).

7. The light source apparatus according to claim 1, wherein the section modulus Z satisfies a condition that a maximum tensile stress in the light transmissive member is smaller than or equal to 100 MPa is therefore greater than or equal to 0.5 but smaller than or equal to 7.0 (0.5≤Z≤7.0).

8. A projector comprising:
the light source apparatus according to claim 1;
a light modulator that modulates light outputted from the light source apparatus; and
a projection system that projects light modulated by the light modulator.

9. The projector according to claim 8,
further comprising a wavelength conversion element that emits fluorescence when excited with the light outputted from the light source apparatus.

10. A light source apparatus comprising:
a base substrate is made of a metal material;
a frame so provided as to face a first surface of the base substrate, wherein the frame is made of a ceramic material;
a light emitting device surrounded by the frame and provided on the first surface of the base substrate; and
a light transmissive member so provided as to face a surface of the frame that is opposite a surface thereof facing the first surface of the base substrate, wherein the frame is so dimensioned that a section modulus of a cross-section of the frame is greater than or equal to 0.5 mm³ but smaller than or equal to 7.0 mm³, wherein the cross-section of the frame is defined as including the entirety of the height h of the frame along with the entirety of the width the of the frame,
wherein a length of the cross-sectional shape in a direction perpendicular to the first surface is greater than or equal to 2.0 mm but smaller than or equal to 3.5 mm, and a length of the cross-sectional shape in a direction parallel to the first surface is greater than or equal to 1.0 mm but smaller than or equal to 3.0 mm; and
wherein a coefficient of linear expansion of the frame is smaller than a coefficient of linear expansion of the base substrate but greater than a coefficient of linear expansion of the light transmissive member.

11. The light source apparatus according to claim 10, wherein the section modulus Z satisfies a condition that a maximum tensile stress in the light transmissive member is smaller than or equal to 100 MPa is therefore greater than or equal to 0.5 but smaller than or equal to 7.0 (0.5≤Z≤7.0).

12. The light source apparatus according to claim 10, wherein the section modulus Z satisfies a condition that a maximum tensile stress in the light transmissive member is smaller than or equal to 100 MPa is therefore greater than or equal to 0.5 but smaller than or equal to 7.0 (0.5≤Z≤7.0).

13. A projector comprising:
the light source apparatus according to claim 10;
a light modulator that modulates light outputted from the light source apparatus; and
a projection system that projects light modulated by the light modulator.

14. A light source apparatus comprising:
a base substrate is made of a metal material;
a frame so provided as to face a first surface of the base substrate, wherein the frame is made of a ceramic material:
a light emitting device surrounded by the frame and provided on the first surface of the base substrate; and
a light transmissive member so provided as to face a surface of the frame that is opposite a surface thereof facing the first surface of the base substrate,
wherein the frame is so dimensioned that a section modulus of a cross-section of the frame is greater than or equal to 0.5 mm³ but smaller than or equal to 7.0 mm', wherein the cross-section of the frame is defined as including the entirety of the height h of the frame along with the entirety of the width b of the frame,
wherein the section modulus Z satisfies a condition that a maximum tensile stress in the light transmissive member is smaller than or equal to 100 MPa is therefore greater than or equal to 0.5 but smaller than or equal to 7.0 (0.5<Z<7.0); and
wherein a coefficient of linear expansion of the frame is smaller than a coefficient of linear expansion of the base substrate but greater than a coefficient of linear expansion of the light transmissive member.

15. A projector comprising:
the light source apparatus according to claim 14;
a light modulator that modulates light outputted from the light source apparatus; and
a projection system that projects light modulated by the light modulator.

* * * * *